United States Patent [19]

Yanagita

[11] Patent Number: 5,321,524
[45] Date of Patent: Jun. 14, 1994

[54] GRAY LEVEL COMPENSATOR FOR PICTURE RECORDER

[75] Inventor: Akiko Yanagita, Hino, Japan

[73] Assignee: Konica Corporation, Tokyo, Japan

[21] Appl. No.: 792,350

[22] Filed: Nov. 14, 1991

[30] Foreign Application Priority Data

Nov. 14, 1990 [JP] Japan .................................. 2-306210

[51] Int. Cl.$^5$ .............................................. H04N 1/40
[52] U.S. Cl. ..................................... 358/455; 358/461; 358/456
[58] Field of Search ................ 358/455, 456, 461, 464, 358/487, 76, 244, 504, 520, 521, 534

[56] References Cited

U.S. PATENT DOCUMENTS

| | | | |
|---|---|---|---|
| 4,472,736 | 9/1984 | Ushio et al. | 358/80 |
| 4,751,377 | 6/1988 | Ishizaka et al. | 358/496 |
| 4,939,581 | 7/1990 | Shalit | 358/244 |
| 4,989,098 | 1/1991 | Arimoto | 358/455 |
| 5,194,945 | 3/1993 | Kadowaki et al. | 358/520 |

FOREIGN PATENT DOCUMENTS 0269033 6/1988 European Pat. Off. .

Primary Examiner—Edward L. Coles, Sr.
Assistant Examiner—Kimberly A. Williams
Attorney, Agent, or Firm—Frishauf, Holtz, Goodman & Woodward

[57] ABSTRACT

An image recording apparatus is provided for receiving an image signal indicating a density level of a pixel, and for converting the image signal into a modulating signal to modulate a beam light so as to reproduce a corresponding density level on a recording medium. The apparatus includes a conversion table for converting between possible image signals and a plurality of modulating signals, a correction circuit for obtaining a plurality of correction values each representing a deviation between a current recording characteristic and a desired recording characteristic on the basis of the plurality of actual density levels; and a table correction circuit for correcting the conversion table on the basis of the correction value for each of the possible image signals.

5 Claims, 12 Drawing Sheets

GRAY LEVEL COMPENSATOR FOR PICTURE RECORDER

BACKGROUND OF THE INVENTION

This invention relates to a gray level compensation for a picture recorder or a density level, compensation for the image recording apparatus, and in particular, to a gray level compensator aiming to prevent fluctuation of a gray level of a recorded picture according to the change of the various factors related to picture recording.

With respect to a picture recorder, a photo scanning recorder is known wherein the light beam is modulated according to the picture signal, the modulated light beam is made to scan the photosensitive material (recording medium) and the photosensitive material exposed thereby is developed (see Japanese Patent Application Laid-open NO.54-42243 and NO.59-83150).

An embodiment of the said photo scanning recorder will be described with reference to FIG. 17. Light beam (laser beam) 2 emitted from semiconductor laser 1 is made into the parallel beam by the collimator lens 3, and is reflected by mirror 4. Then it enters light deflector 5 such as a rotary polygon mirror. Light beam 2 is reflected and deflected by said light deflector and is led into the convergent lens 6, through which it scans the photosensitive material in the direction approximately at a right angle to the arrowed Y-direction (main scanning). At the same time, the photo sensitive material 7 is transferred in the said arrowed Y-direction by the, transfer unit not illustrated in the said FIG. 17, and is scanned (sub-scanning), whereby light beam 2 is irradiated on the photo sensitive material 7 two-dimensionally.

Said light beam 2 is modulated according to the picture signal output from the picture signal output device, and the picture carried by the said picture signal is recorded as photographic latent image on said photo sensitive material 7 when exposed by this modulated light beam.

Referring to FIG. 18, the picture signal is a digital signal, and is led into the signal conversion circuit 9 via the picture memory 8, as shown in FIG. 18: where it is converted into a light modulation signal, which, in turn, is converted into analog signal by the digital-to-analog converter 11 after passing through the latch circuit 10. The said analog light modulation signal enters the light modulation circuit 12, which modulates the laser beam emitted from said semiconductor laser 1. The said modulated laser beam scans the photo sensitive material (film) 7, and the picture image is thereby recorded as a photographic latent image.

Furthermore, the exposed photo sensitive material 7 is sent to the known development processor 13, where said photo sensitive material is subjected to development, fixing, water-washing and drying. Through this process, the said photographic latent image is developed, and the picture image carried by the said image signal is recorded on the photo sensitive material 7 as a visible image.

The semiconductor laser 1 is directly modulation-driven in the said light modulation circuit 12. When the gas laser is used as a light source, intensity modulator including the acousto-optical modulation element (AOM) is normally employed.

PROBLEMS TO BE SOLVED

FIG. 19 shows the picture signal and an example of gray level characteristic recorded on the photo sensitive material, that is, gradation characteristic. As is clear from the said FIG, the gradation characteristic is not linear relative to the picture signal, and fails to obtain a high-gradation picture. The following shows the reasons why the recording gray level fails to be linear relative to the picture signal:

(1) The recording media including the photo sensitive material have non-linear characteristics. (The relation between the logarithm of the light amount and density is not linear.)

(2) Intensity modulators including the acousto-optical modulation element (AOM) have non-linear characteristics.

(3) When the semi-conductor laser is used, the relation between the current supplied to the semi-conductor and the emitted light amount is non-linear.

Thus, the signal conversion circuit shown in said FIG. 18 is normally provided, and the conversion table of the picture signal serving as a inverse function of the function showing the relation between the picture signal and recording gray level is provided on the said signal conversion circuit 9, as shown in FIG. 20. Thus, the input picture signal is converted according to the said conversion table, thereby getting the total characteristics (picture signal to recorded gray level) which are maximally linear.

However, even if the same picture recorder and developer and the same type of the photo sensitive material ware used, the recording gray level may be changed due to the difference of the equipment, adjustments and environmental conditions, sequential time changes of the light source for exposure, difference in the production lot of the photosensitive material and many other factors. For example, if such problems exist in recording the medical pictures which require particularly excellent gradation range, the diagnostic capacity of these pictures will be decreased.

To overcome this difficulty, some existing systems modify the conversion characteristic (conversion table) in the said signal conversion circuit in order to cope with the changing conditions (Japanese Patent Application Laid-open NO.58-190950).

For example, according to the conversion table setting method disclosed in Japanese Patent Application Laid-open NO.58-190950 Official Bulletin, pictures are recorded and developed based on the known picture signal without using the conversion table, and the gray level of the recorded and developed pictures is measured. Getting the characteristic function of the recorded gray level to the picture signal, based on more than one set of the said picture signals and resultant picture gray levels, the table is determined as an inverse function of this function. The interpolation of the discrete data consisting of the relation between the said picture signal and recorded gray level is calculated, the smoothing process for this calculation is further conducted, and whereby a perfectly new conversion table that the input picture signal is converted into the light amount control signal (light modulation signal) is provided creation.

As described above, when a new conversion table is to be determined, as a continuous data, through calculation of the interpolation and smoothing process of the discrete conversion characteristic data comprising the gray level data gained by actual picture recording and development on the basis of the known picture signal, the interpolation error for the desired characteristics will increase between sample data if the number of the sample data is small, and a desired precision of conversion characteristics cannot be ensured. This problem is attributable to the fact that the desired conversion characteristic is generally as shown by the curve of FIG. 10, and the change rate of the curve (linear differential) is conspicuous locally in the area corresponding to the picture signal area R in FIG. 20.

On the other hand, according to the method disclosed in Japanese Patent Application Laid-open NO.59-83150), three reference recorded gray levels are set; then the reference signal anticipated to reach the said reference recorded gray levels is found out, and the actual picture recording and development is performed based on this reference signal; thus, the gray level of the resultant recorded picture is measured. The reference gradation characteristic is compensated based on the obtained gray level data, in such a manner as will satisfy the requirements of the sensitivity (level of gradation curve) and degree of gradation (inclination of the gradation curve) at the reference gradation characteristic.

When the gray level characteristic changes within a small range according to the above method, the problem can be solved by compensating the reference gradation curve. However, if this characteristic changes very much, it is difficult to improve the characteristics to a high precision, because there are few parameters to show how it changes. Not only that, the reference gradation curve must satisfy the characteristics to some extent, and the linear characteristic cannot simply be used as a reference gradation characteristic. Solution of this problem is quite complicated.

SUMMARY OF THE INVENTION

In compliance with such requirement, an object of the present invention is to provide a gray level compensator for picture recorder, which enables high-precision updating and setting of the picture signal conversion table despite a small volume of sampling data and great change of the characteristics, and which ensures the conversion table in conformity to the changing conditions, by using any given table for a reference conversion table as a compensation target.

Thus, in a picture recorder which, according to the first embodiment of the present invention, is provided with a signal conversion means to convert the input picture signal in conformity to the specified conversion table, as shown in FIG. 1, and which is so configured as to record the gradation picture by causing the scanning of the light modulated by a light modulating means to scan the recording medium, on the basis of the picture signal converted by this signal conversion means, said gray level compensator is configured to comprise;

(1) A gray level data detection means wherein plural reference input picture signals are converted according to the reference conversion table, and are put into each light modulating means, and the gray level data of the recorded picture actually gained corresponding to each of the said plural reference input picture signals are obtained;

(2) A picture signal deflection detecting means which obtains the desired input picture signal corresponding to each of the plural gray level data detected by the gray level detecting means, based on the relation of the desired recorded picture gray level with respect to the preset reference input picture signal, and which finds the deflection or deviation between the said desired input picture signal and the reference input picture signal at the time of recording the picture for each of the said plural gray level data;

(3) An interpolation calculating means which calculates interpolation of the discrete deflection data relative to the reference input picture signal detected by the said picture signal deflection detecting means, and (4) A table compensation setting means which compensates the said reference conversion table based on the continuous deflection data interpolated by the said interpolation calculating means and which sets the said compensated conversion table as a specified conversion table for the signal converting means.

DETAILED DESCRIPTION OF THE PREFERRED EMBODIMENT

Figure 1:
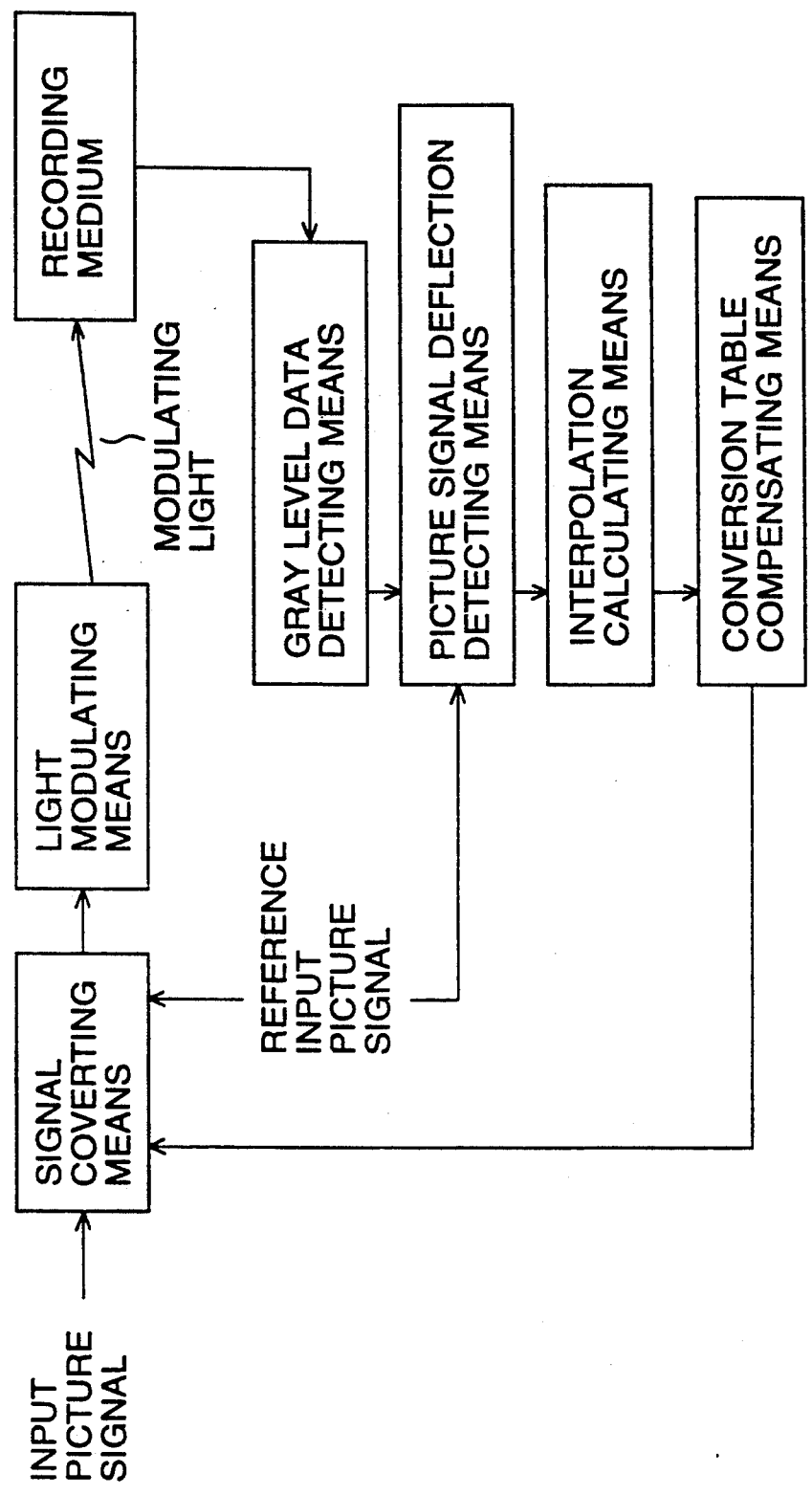
FIG. 1 is a block diagram representing the configuration of the first embodiment of the present invention.
Figure 2:
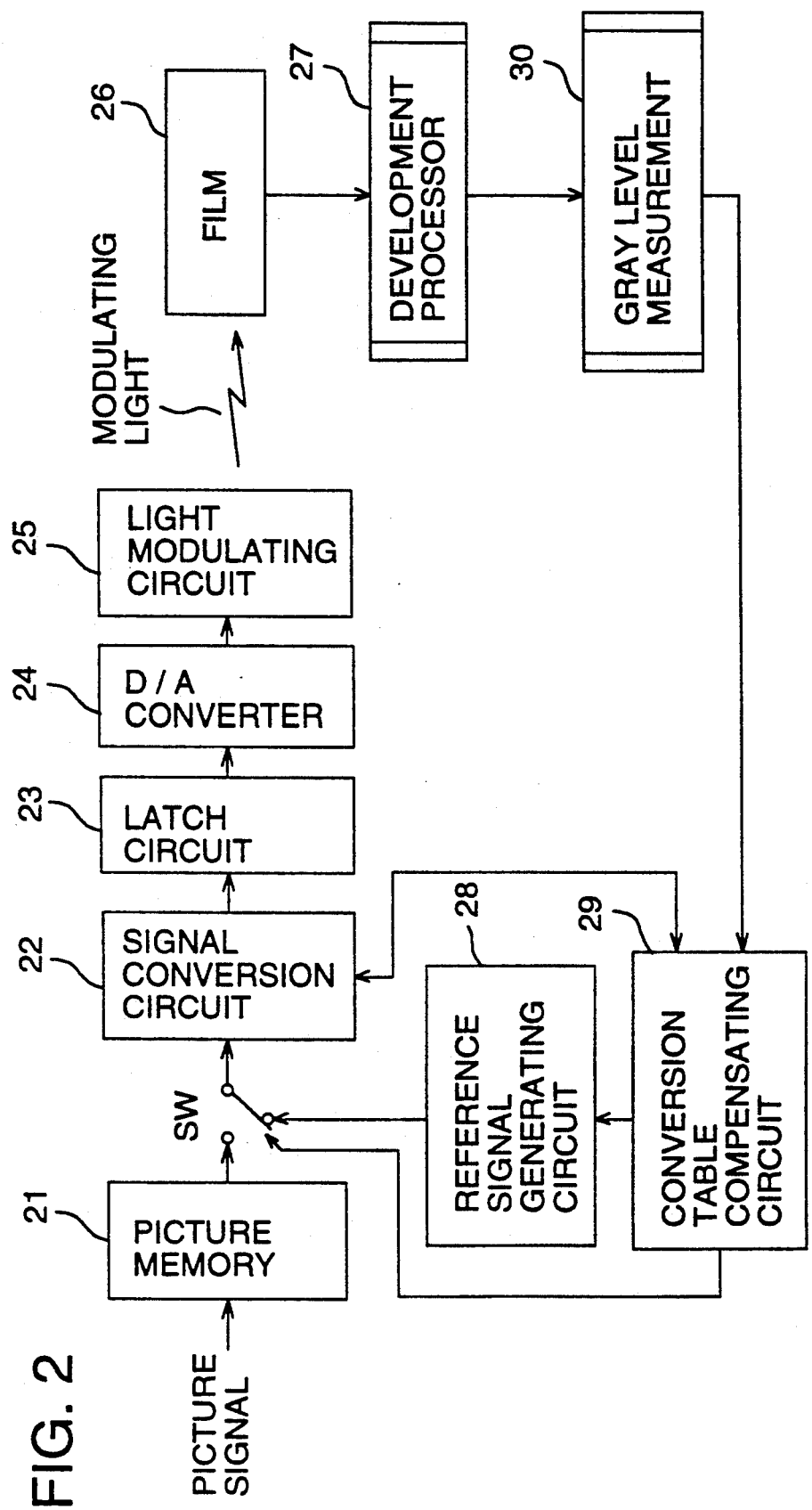
FIG. 2 is a system block diagram representing the first embodiment of the picture recorder of the present invention.

Embodiments of the present invention will be described with reference to the figures. In FIG. 2 representing the first embodiment, the picture signal is arranged to be input to the picture recorder as a digital signal, which is once stored in picture memory 21.

The input picture signal stored in picture memory 21 is output sequentially into the signal conversion circuit 22 which is a signal converting means, and is converted into the light modulation signal according to the specified conversion table in said signal conversion circuit 22.

The light modulation signal obtained by conversion at the signal conversion circuit 22 is converted into the analog signal by the digital-to-analog converter 24 via the latch circuit 23.

The said analog signal is input into the light modulation circuit 25, and the said light modulating circuit 25 modulates the light beam emitted from the light source including the semi-conductor laser (not illustrated). When the semi-conductor laser is used as a light source, said semi-conductor laser is directly modulated and driven by light modulation circuit 25. When the gas laser is used as a light source, the intensity modulator including the acousto-optical modulation element (AOM) is used as a light modulating means.

The light beam modulated above scans the film (photo sensitive material) 26 as a recording medium, via a optical device comprising the collimator lens, mirror, light deflector and convergent lens, and the scanning means comprising the transfer device for the film.

The exposed film 26 is sent to the known development processor 27, where it is developed, fixed, waterwashed and dried. This development process develops the said photographic latent image, and the picture carried by the said picture signal is recorded on the film 26 as visible image.

The development processor 27 may be provided integral with the picture recorder, and the film 26 exposed in the picture recorder may be automatically sent to the development processor 27, where the film is developed. Or the development processor 27 may be provided separate with the picture recorder, and the exposed film may be brought and set into the development processor 27 by a human operator.

In addition to the above configuration, the present invention is provided with the following configuration to compensate the signal conversion table in signal conversion circuit 22 effectively according to the changes of the recorded gray level characteristics due to environmental conditions change and sequential time change:

The equipment according to the present invention is provided with the reference picture signal generating circuit 28 to check the recorded gray level characteristics actually obtained for the input picture signal, instead of the ordinary input picture signal. Receiving the instruction from the conversion table compensating circuit 29, said reference picture signals generating circuit outputs plural kinds of picture signals $X_i$ ($i=0, 1, 2, 3, \ldots n$) for the test pattern which is preset in advance for the signal conversion circuit 22. To put it in greater detail, signals are generated to ensure that the pictures corresponding to each picture signal $X_i$ will be recorded checkerwise in the specified size.

Said conversion table compensating circuit 29, for example, compensates the signal conversion table in signal conversion circuit 22 into the characteristics suited to the current recording conditions, based on the trigger signal or similar signal from the outside. When the conversion table is to be compensated, reference picture signal $X_i$ from the reference picture signal generating circuit 28 (not the picture signal memorized in picture memory 21) is forced to put into the signal conversion circuit 22, by the control of the switch SW.

In this case, after signal conversion circuit 22, the picture is processed in the same manner as in the ordinary picture recording, and is recorded on the film 26 in conformity to the reference picture signal $X_i$. If said film is developed, the picture recorded according to reference picture signal $X_i$ is made visible. Here gray level measuring instrument 30 is provided to ensure that the gray level of the recorded picture (of test pattern) based on the reference picture signal $X_i$ is measured for each reference picture signal $X_i$.

In the type of the equipment where the picture recorder and developing processor 27 are integrally provided and the picture is developed automatically, it is possible to set the equipment so that the gray level is automatically measured by the gray level measuring instrument 30, only when the recording is made (test pattern is recorded) based on the reference picture signal according to the instruction from said conversion table compensating circuit 29.

In the type of the equipment where the picture recorder and development processor 27 are provided separately with each other, and the picture can be developed as desired, it is possible to set the equipment so that the gray level of the test pattern is measured by manual operation.

The measured data by gray level measuring instrument 30 is input into the conversion table compensating circuit 29 online or by manual operation on the keyboard.

Conversion table compensating circuit 29 provides the updating of the conversion table in signal conversion circuit 22 according to the gray level characteristics resulted from actual recording of the pictures, based on the reference picture signal $X_i$, as described above. The said reference picture signal may be preset or may be set as desired by the keyboard operation.

In the present embodiment, the function as of a gray level data detecting means is realized by the gray level measuring instrument 30, reference picture signal generating circuit 28 and conversion table compensating circuit 29; furthermore, the conversion table compensating circuit 29 also serves as a picture signal deflection detecting means, interpolation calculating means and conversion table compensating setting means.

Next, compensation and setting of the conversion table according to the said configuration will be described in detail with reference to the flow chart in FIG. 3 and diagrams in FIGS. 4 through 6.

Figure 3:
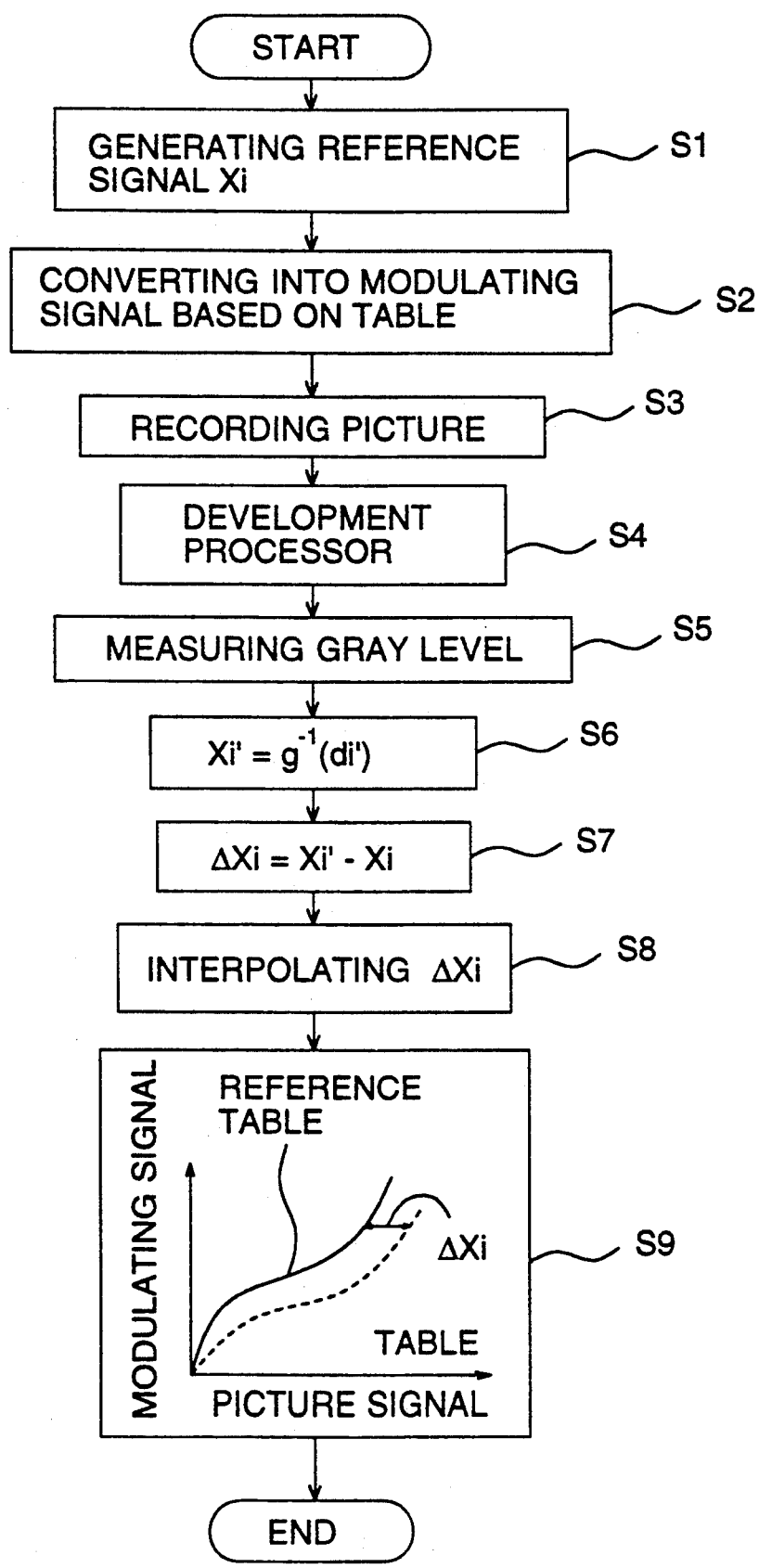
FIG. 3 is a flowchart representing how the conversion table is updated in the first embodiment.

In the flow chart in FIG. 3, reference picture signal $X_i$ is input from reference picture signal generating circuit 28 into signal conversion circuit 22 in the S1, and said reference picture signal $X_i$ is converted into the light modulation signal according to the reference conversion table in the S2.

In the present embodiment, the conversion table is updated and set in conformity to the changing conditions through compensation of the current conversion table. The said reference conversion table may be the conversion table which is used for conversion when the picture is actually recorded in signal conversion circuit 22. More simply, it is possible to use the table with the linearly set relation between the input picture signal and light modulation signal, or conversion table which approximately satisfies the desired characteristics of the recorded gray level for the picture signal, which is stored in advance. Needless to say, it is possible to use such configuration that the conversion table previously updated and set is compensated again.

It is possible to use the configuration so that any one of the reference conversion tables is selected, depending on the object of the conversion table, for example, depending on whether the object is to compensate a slight change caused by the environmental conditions, using the same picture recorder, developer and film, or to compensate it when the type of the equipment and film has been changed.

In the S3, light modulation is performed according to the light modulation signal obtained by converting the reference picture signal Xi according to the reference conversion table, and the film 26 is scanned, thereby recording the photographic latent image of the test pattern for reference picture signal Xi.

In the S4, the result of said recording is made visible through development process in development processor 27. In the next S5, recorded picture gray level di' obtained by the development is measured for each reference picture signal Xi by gray level measuring instrument 30.

Processing in the S6 and thereafter is performed by the arithmetic operation device (not illustrated) built in conversion table compensating circuit 29.

The S6 finds that the gray level di' obtained by actually recording the picture according to reference picture signal Xi corresponds to which picture signal Xi' ($=g-1(di')$), from the said desired characteristic g(X), by referring to the desired characteristic g(X) (see FIG. 4) of the recording gray level for the picture signal which is set and stored in advance.

Figure 4:
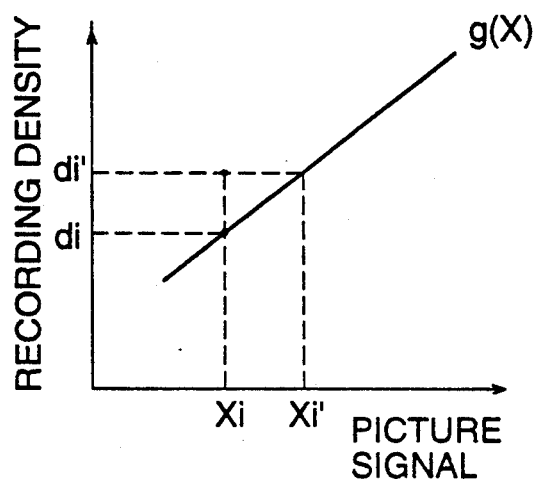
FIGS. 4 through 6 are diagrams representing how the conversion table is updated in the first embodiment.

In other words, when the reference conversion table is such that the desired characteristic g(X) shown in FIG. 4 is satisfied, grey level di should be gained as recorded gray level if the picture is recorded according to reference picture signal Xi. However, gray level di' is obtained actually instead of said gray level di. This means that the reference conversion table has characteristics which does not satisfy desired characteristic g(X).

It is intended to find the gray level di' actually obtained corresponding to the picture signal Xi' from desired characteristic g(X), and it has been confirmed that the recorded gray level obtained by converting the reference picture signal Xi according to reference conversion table becomes di' under the present situation. It is also known that the gray level di' is gained by recording with the light modulation signal f (Xi) which is got by converting the reference picture signal Xi according to the reference conversion table.

Therefore, to ensure that the gray level di' will correspond to picture signal Xi' for satisfying desired characteristic g(X), light modulation signal gained by converting the picture signal Xi' according to the conversion table should be f (Xi).

Figure 5:
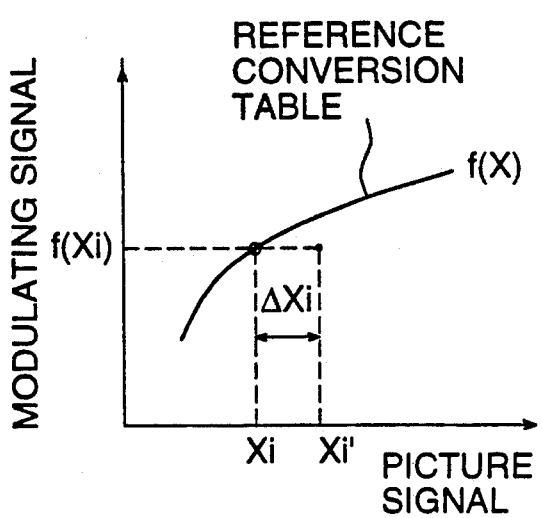
Figure 6:
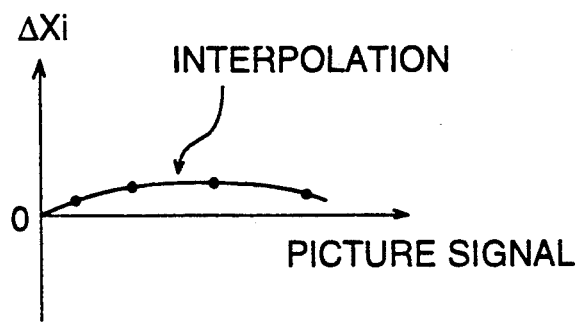

As is clear from FIG. 5 representing the conversion table which assumes the picture signal on the axis of abscissas, and the light modulation signal on the axis of ordinates, if the point corresponding to the reference picture signal Xi of the reference conversion table is shifted $\Delta Xi = (Xi' - Xi)$ toward the direction of the picture signal (horizontal direction in the drawing), then the light modulation signal f(Xi) will be obtained when the picture signal Xi' is converted. Gray level di' is gained when the picture is recorded according to this light modulation signal f (Xi); at least, the picture signal Xi' is now compensated to have the conversion characteristics which satisfy desired characteristic g(X) shown in FIG. 4.

Thus, the S6 and S7 find the picture signal Xi', which corresponds to the obtained recorded gray level di' regarding desired characteristic g(X) for each reference picture signal Xi (i=0,1, 2, 3, ..., n), and, at the same time, calculate the deflection $\Delta Xi=(Xi'-Xi)$, which amounts to the shift of the reference conversion table in order to satisfy the conversion characteristics in each picture signal Xi'.

Through the above processing, the data on shift amount $\Delta Xi$ (deflection) for shifting the reference conversion table in the horizontal direction is obtained as corresponding to the picture signal by the same number as that of the reference picture signals Xi. In the S8, the data for said $\Delta Xi$ is obtained as continuous data on the picture signal through calculation of interpolation of the said $\Delta Xi$, as shown in FIG. 6.

Said $\Delta Xi$ is a data which compensates the reference conversion table into the characteristic which corresponds to desired gradation characteristic g (X). Especially when the reference conversion table satisfies the desired gradation characteristic g(X), its absolute value is sufficiently small (see FIG. 6), so the precision of interpolation does not reduce substantially even if the interpolation is performed according to comparatively small amount of data $\Delta Xi$; the value to shift through the reference conversion table can be estimated with high precision between the sampling data. Even when the required characteristic is much changed from the reference conversion table and the absolute value of the said $\Delta Xi$ is increased, the change rate of the said $\Delta Xi$ with respect to the picture signal level does not increase very much; therefore, it is quite possible to cope with the great change of the required characteristics.

In the S9, the reference conversion table is shifted in the axial direction of the input picture signal for compensation, based on the data $\Delta Xi$ interpolated and calculated in the S8, and the result of this compensation is set as a conversion table which satisfies the said desired gradation characteristic g(X) under the current recording conditions. From then on, the signal is converted in the signal conversion circuit 22 according to the conversion table obtained by compensation of the reference conversion table.

If the conversion table used in the signal conversion circuit 22 can be compensated and set according to the relation between the picture signal and the recorded gray level actually obtained, then the desired recording gray level can be ensured for the picture signal with much stability, even if the exposure characteristic of the recording medium and light amont characteristic of the light source for exposure have changed due to the changing of ambient temperature and sequential time change, or the development characteristic of the recording medium has changed due to the development temperature and development speed. This feature improves the diagnostic capacity in the picture for medical treatment (radioactive image) which requires a especially high degree of gradation.

The above description of the present invention can be summarized as follows: The picture is recorded by converting the reference input picture signal according to the reference conversion table; consequently, in cases where the said reference conversion table satisfies the relation between the preset input picture signal and the desired gray level of the recorded picture, the gray level of the picture recorded by converting the reference input picture signal should basically agree with the said desired gray level of the recorded picture. For example, if converted image signal B is obtained through conversion of the reference input picture signal A according to the reference conversion table, and the picture gray level C got from said converted image signal B fails to satisfy the desired characteristic, it can be confirmed conversely that use of B as the converted signal is effective to get the picture gray level C.

This has revealed that, assuming that the input picture signal to get the picture grade level C is D, the conversion table satisfying the desired characteristics can be created, by compensating and setting the reference conversion table in such a manner that the input picture signal D is converted into B according to the conversion table.

Here in the conversion table, the input picture signal corresponding to the converted image signal B is to be changed from A to D. So in the characteristic diagram for the conversion table where the input picture signal is plotted on the axis of abscissas and the converted picture signal (light modulation signal) on the axis of ordinates, at least the desired conversion characteristic with respect to the input picture signal D can be obtained, if the point on the reference conversion table corresponding to input picture signal A is shifted in the horizontal direction by the difference between input picture signals A and D. If it is possible to get the continuous data on the shift volume to obtain desired characteristics, the reference conversion table can be compensated to have the desired characteristics.

Thus, if the data corresponding to the deflection between said input picture signals A and D are obtained for each reference input picture signal, and said discreet deflection data are made into continuous data by calculation of the interpolation, and this continuous deflection data, in other words, the reference conversion table, which is made from the conversion of the reference input picture signal on the basis of the continuous shift volume data in the direction of the input picture signal axis on the conversion characteristic curve, is compensated, then it is possible to get the conversion table which satisfies the relation between the desired input picture signal and recorded gray level.

Here even if the reference conversion table is made to have linear characteristics, the function of the said signal deflection data obtained in the manner described above generally does not include the portion where the change rate increases very much, and then, even if the number of the data on deflection is few, high precision calculation of interpolation is possible using the known interpolation calculating method, thereby ensuring high precision compensation of the reference conversion table.

Figure 7:
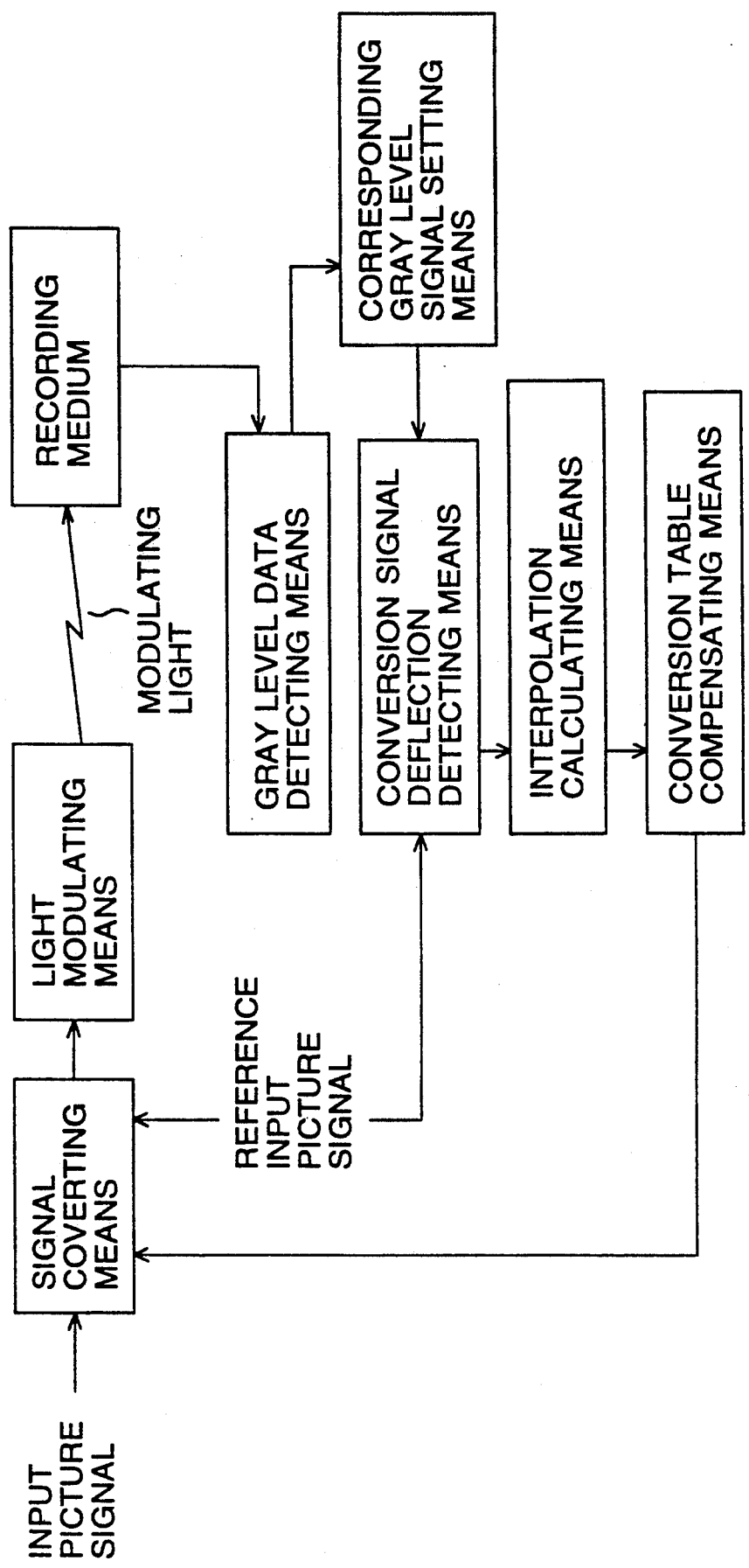
FIG. 7 is a block diagram representing the configuration of the second embodiment of the present invention.

The second embodiment of the present invention will be described with reference to FIG. 7. As shown in the drawing, in the picture recorder which is provided with a signal converting means to converts the input picture signal according to the specified conversion table, and which is designed to record the gradation picture on the recording medium being scanned by the light modulated by the light modulating means according to the picture signal converted by said signal converting means, the gray level compensator is configured to comprise;

(1) A gray level data detecting means to get the data on gray level of the recorded picture actually gained as corresponding to the each said reference input picture signal, by converting the reference input picture signals according to the reference conversion table and by entering them into the said light modulating means;

(2) A gray level corresponding signal setting means to get desired input picture signals which correspond to gray level data detected by said gray data detecting means according to the relation of the desired recording picture gray level relative to the input picture signal, which is set in advance;

(3) A converted signal deflection detecting means to get the deflection between the signals obtained by converting the desired input picture signal set by the gray level correspondence signal setting means and the said corresponding reference input picture signal according to the said reference conversion table, for each gray level data detected by the said gray level data;

(4) An interpolation calculating means to calculate the interpolation of the discreet deflection data on the input picture signal obtained by this converted signal deflection detecting means; and (5) A conversion table compensating and setting means to compensate the said reference conversion table based on the continuous deflection data interpolated by said interpolation calculating means and to set the compensated conversion table as a specified conversion table in the said signal converting means.

Figure 8:
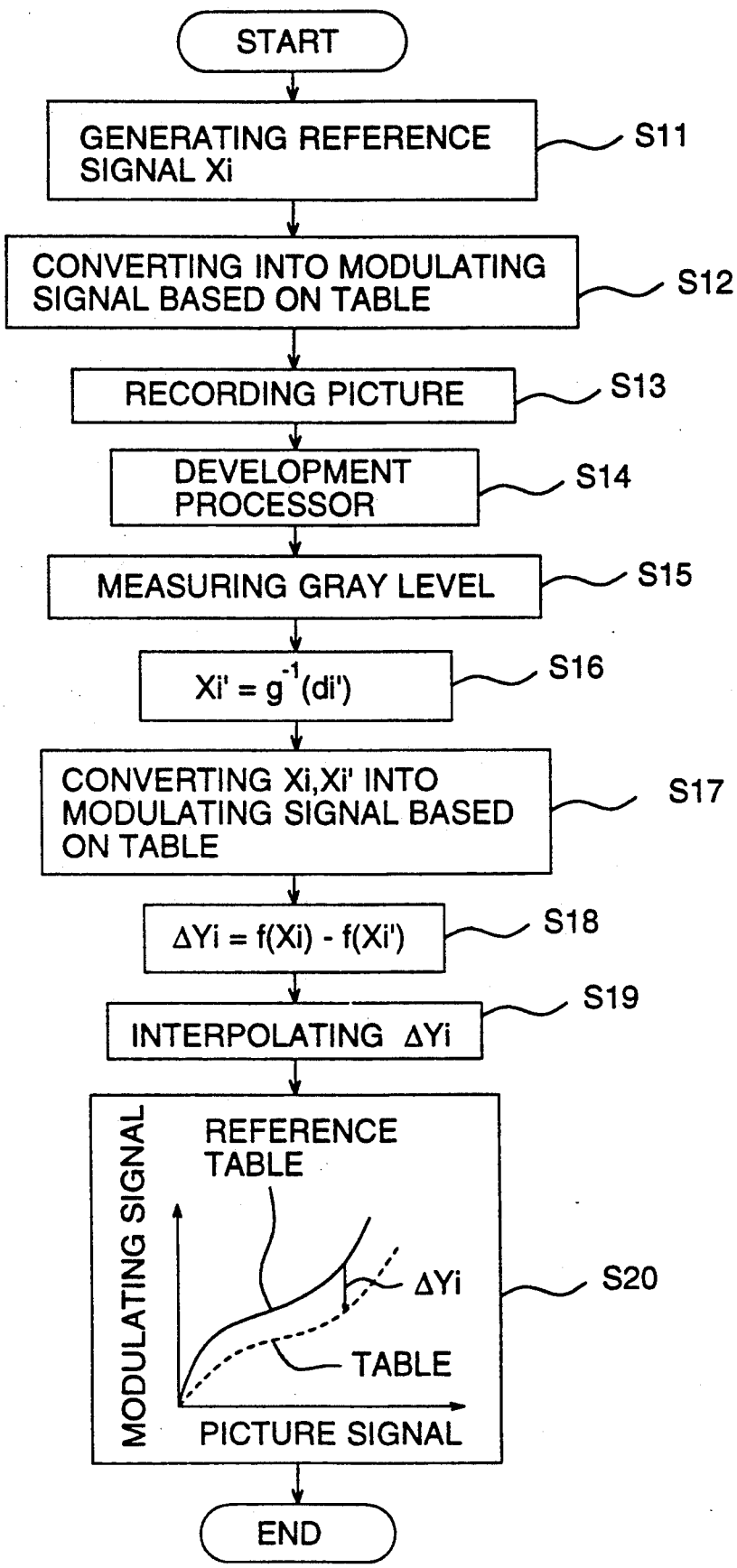
FIG. 8 is a flowchart representing how the conversion table is updated in the second embodiment.
Figure 9:
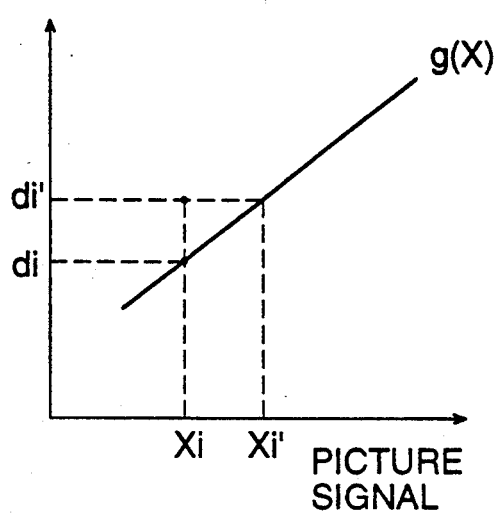
FIGS. 9 through 11 are diagrams representing how the conversion table is updated in the second embodiment.
Figure 10:
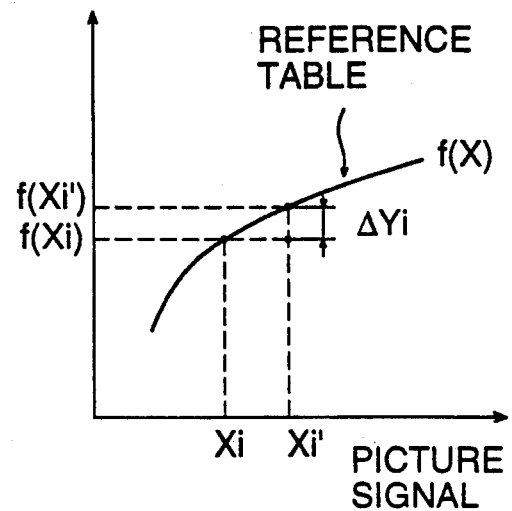

The second embodiment is also realized by the picture recorder illustrated in FIG. 2. The description is given to the compensating and setting procedure with reference to the flow chart in FIG. 8 and the diagrams in FIGS. 9 through 11. Steps 11 through 15 in FIG. 8 are the same as the S1 through S5 in FIG. 3. As shown in FIGS. 9 and 10, correspondence between the gray level $di'$ and picture signal $Xi'$ to satisfy desired characteristic $g(X)$ can be achieved by assigning $f(Xi)$ to the light modulation signal obtained by converting the picture signal $Xi'$ according to the conversion table. As is clear from FIG. 10 which represents the conversion table assuming the input picture signal on the abscissas and the light modulation signal on the ordinates, suppose that $f(Xi')$ is assigned to the light modulation signal obtained by converting the picture signal $Xi'$ according to the reference conversion table: If the point on the reference conversion table corresponding to input picture signal $Xi'$ is shifted in the direction of the light modulation signal (direction of the axis of ordinates) by $\Delta Yi = f(Xi) - f(Xi')$, then the light modulation signal $f(Xi)$ will be obtained when the picture signal $Xi'$ is converted according to the conversion table. When the picture is recorded according to this light modulation signal $f(Xi)$, gray level $di'$ will be obtained This means that compensation is successful, at least with regard to picture signal $xi'$, in providing conversion characteristic which satisfies desired gradation characteristic $g(X)$ as shown in FIG. 9.

The picture signal $Xi'$ which corresponds, with respect to the desired characteristic $g(X)$, to the recorded gray level $di'$ obtained for each reference input picture signal $Xi(i0,1,2,3,\ldots,n)$ is found in the S16, and reference input picture signal $Xi$ and said desired input picture signal $Xi'$ are each converted according to the reference conversion table in the next step 17, thereby getting light modulation signal $f(Xi)$ and $f(Xi')$. In order to satisfy conversion characteristics for each picture signal $Xi'$, the S18 calculates said deflection $\Delta Yi = f(Xi) - f(Xi')$ which represents the amount of shifting the reference conversion table.

Figure 11:
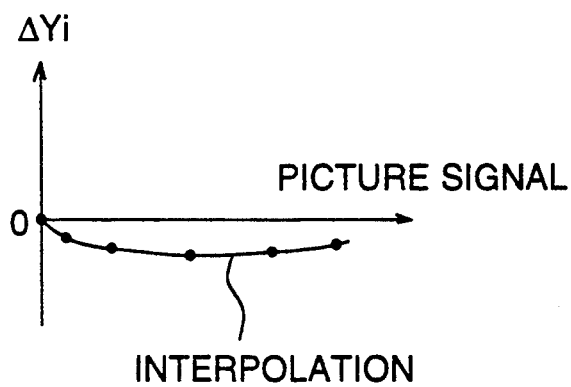
Figure 12:
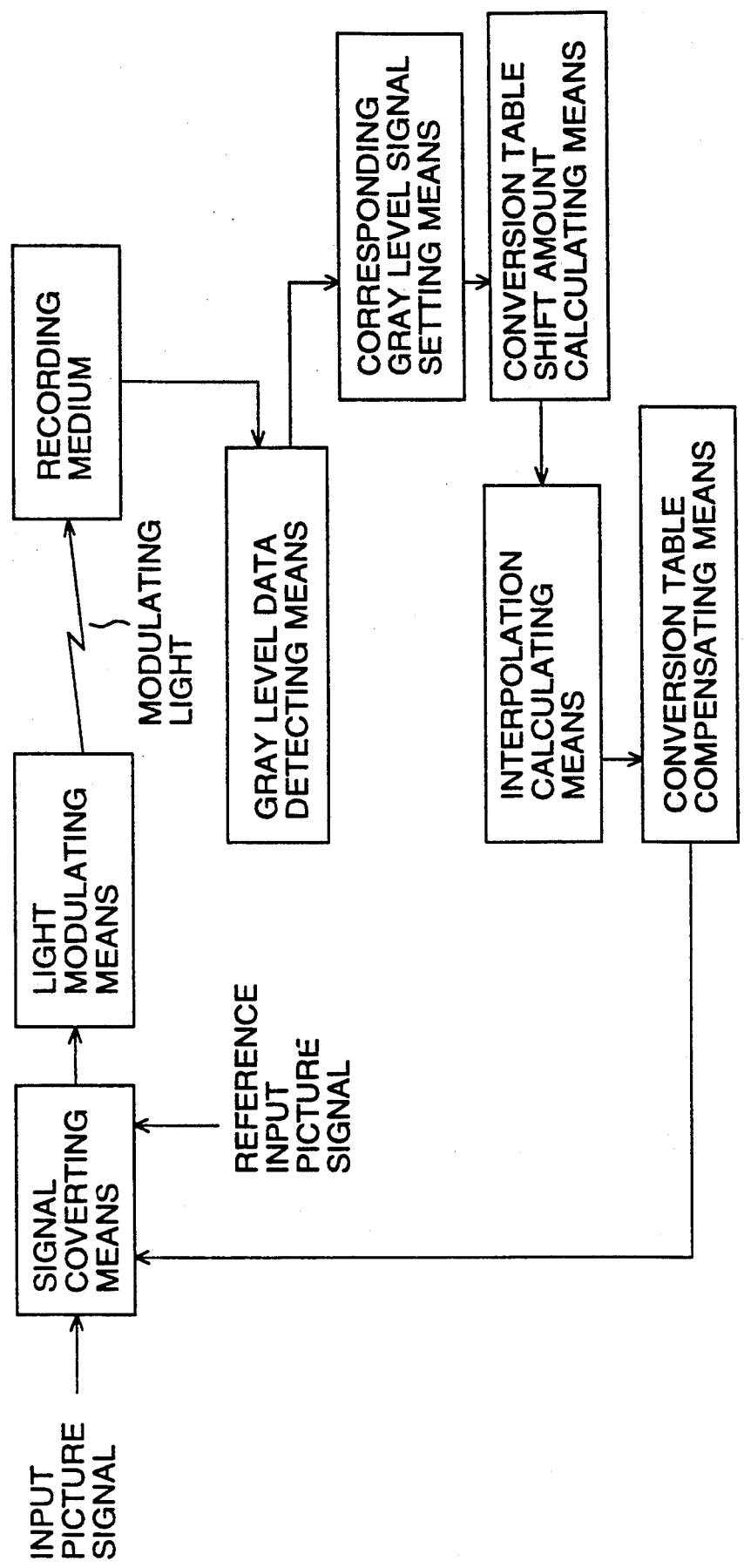
FIG. 12 is a block diagram representing the configuration of the third embodiment of the present invention.

Through the above processing, the data on shift volume $\Delta Yi$ (deflection) for shifting the reference conversion table in the vertical direction (the direction of the light modulation signal) is obtained as corresponding to the desired picture signal $Xi'$ by the same number as that of the reference picture signals $Xi$. In the S19, the discrete data $\Delta Yi$ obtained as corresponding to the desired picture signal $Xi'$ is made continuous, through calculation of interpolation of the said $\Delta Yi$, as shown in FIG. 11.

Said ΔYi is a data which compensates the reference conversion table into the characteristic satisfying desired gradation characteristic g (X). Especially when the reference conversion table satisfies the desired gradation characteristic g(X), its absolute value is sufficiently small (See FIG. 11), so the precision of interpolation does not reduce substantially even if the interpolation is performed according to comparatively small amount of data ΔYi; the value to move the reference conversion table can be estimated with high precision between the sampling data. Even when the required characteristic is much changed from the reference conversion table and the absolute value of the said ΔYi is increased, the change rate of the said ΔYi with respect to the picture signal level does not increase very much; therefore, it is quite possible to cope with the great change of the required characteristics.

In the S20, the reference conversion table f(X) is shifted in the direction of the light modulation signal (direction of the vertical axis) for compensation (f(X')+Yi(X')), based on the data Yi interpolated in the S19, and the result of this compensation F(X')=f(X')+ΔYi(X') is set as a new conversion table which satisfies the said desired gradation characteristic g(X) under the current recording conditions. From then on, the signal is converted in the signal conversion circuit 22 according to the conversion table obtained by compensation of the reference conversion table.

The above description of second embodiment of the present invention can be summarized as follows: For example, if signal B is obtained through conversion of the reference input picture signal A according to the reference conversion table, and the picture gray level C got from said signal B fails to satisfy the desired characteristic, B as the converted signal can be used to get the picture gray level C, conversely.

This has revealed that, assuming that the input picture signal to get the picture gray level C is D, the conversion table satisfying the desired characteristics can be created, by compensating and setting the reference conversion table in such a manner that the input picture signal will be converted into B according to the conversion table.

If the input picture signal D corresponding to the converted recorded gray level C is to be changed to E according to the reference conversion table before compensation, the conversion data corresponding to the input picture signal D should be changed from E to B which corresponds to input picture signal A. In the characteristic diagram for the conversion table where the input picture signal is plotted on the axis of abscissas and the converted picture signal (light modulation signal) on the axis of ordinates, at least the desired conversion characteristic with respect to the input picture signal D can be satisfied, if the point on the reference conversion table corresponding to input picture signal D is shifted in the vertical direction by the difference between converted input picture signals E and B. If it is possible to get the continuous data on the shift volume to obtain such desired characteristics, the reference conversion table can be compensated to have the desired characteristics.

Thus, if the data on shift volume for compensating the conversion table to have the desired characteristics for each reference input picture signal, and the deflection data obtained for each desired input picture signal to correspond to each of this gray level data is made into continuous data by interpolation thereby compensating the reference conversion table according to which the reference input picture signal is converted based on the continuous shift volume data, then it is possible to get the conversion table which satisfies the relation between the desired input picture signal and recorded gray level.

The third embodiment of the present invention will be described with reference to FIG 2 as shown in the drawing, in the picture recorder which is provided with a signal converting means to convert the input picture signal according to the specified conversion table, and which is designed to record the gradation picture on the recording medium being scanned by the light modulated by the light modulating means according to the picture signal converted by said signal converting means, the gray level compensator is configured to comprise;

(1) A gray level data detecting means to get the data on gray level of the recorded picture actually gained as corresponding to the each said reference input picture signal, by converting the reference input picture signals according to the reference conversion table and by entering them into the said light modulating means;

(2) A gray level corresponding signal setting means to get the desired input picture signals which correspond to gray level data detected by said gray data detecting means according to the relation of the desired recording picture gray level relative to the input picture signal which is set in advance;

(3) A conversion table deflection calculating means to obtain the compensated coordinate points on the reference conversion table which are located at the minimum distance from each of the compensating coordinate points determined by the desired input picture signal set on the gray level corresponding signal setting means and by the signal obtained through conversion of converting the said corresponding reference input picture signal according to the said reference conversion table, and the minimum distance in the quadratic coordinate comprising the input picture signal axis in the reference conversion table and the converted picture signal axis;

(4) An interpolation calculating means to calculate the interpolation of the discrete data at the minimum distance from the compensated coordinate points on the reference conversion table obtained by said conversion table deflection calculating means, and (5) A conversion table compensating and setting means to compensate the said reference conversion table based on the continuous data on the minimum distance from the compensated coordinate points which are interpolated by the interpolation calculating means, and to compensate the said compensated conversion table as a specified conversion table in the said signal converting means.

Figure 13:
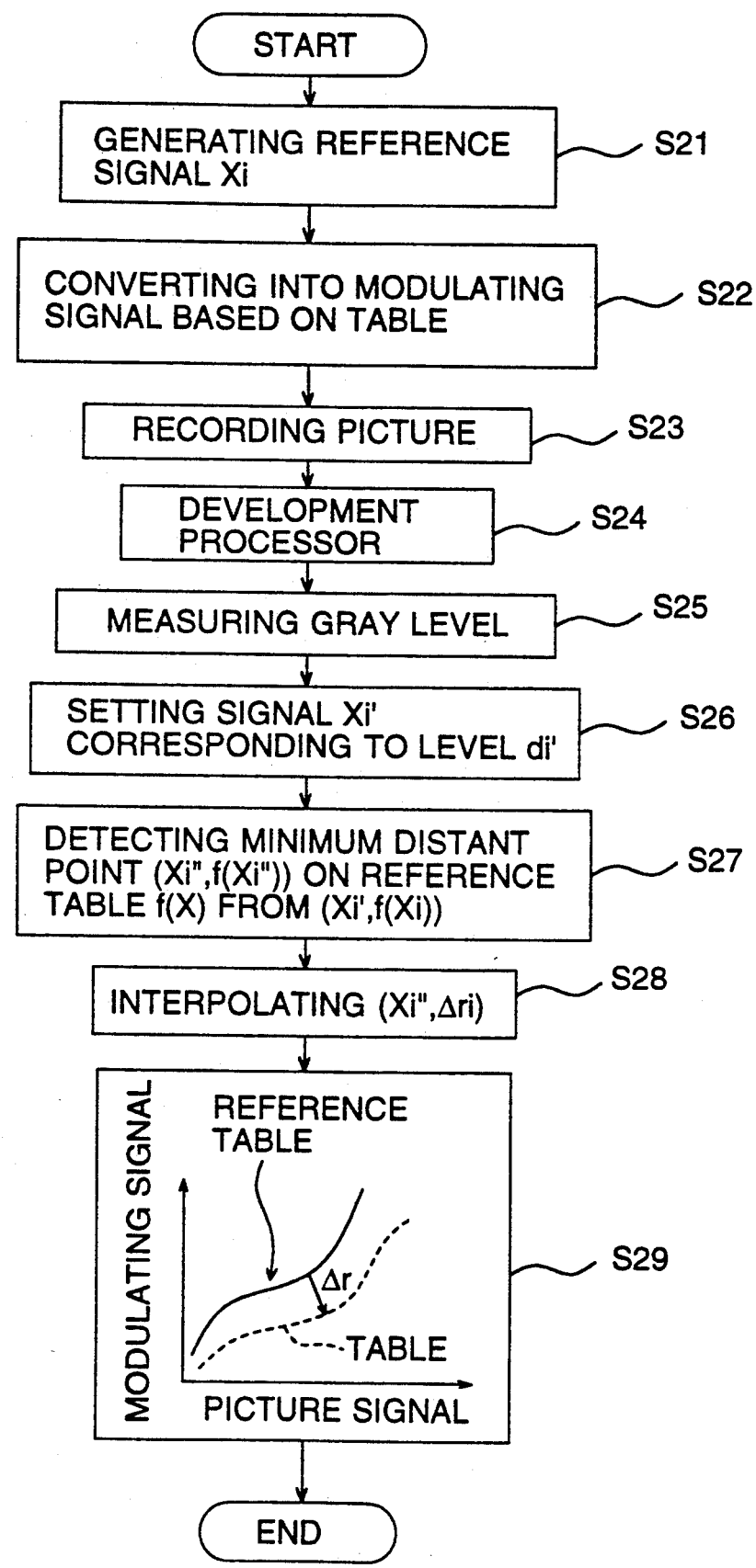
FIG. 13 is a flowchart representing how the conversion table is updated in the third embodiment.
Figure 14:
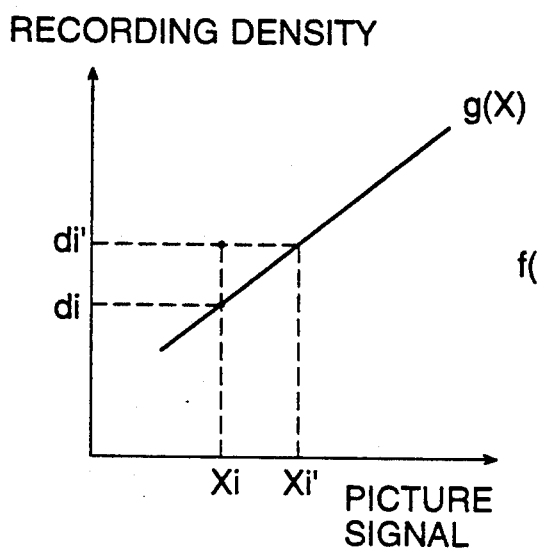
FIGS. 14 through 16 are diagrams representing how the conversion table is updated in the third embodiment.
Figure 15:
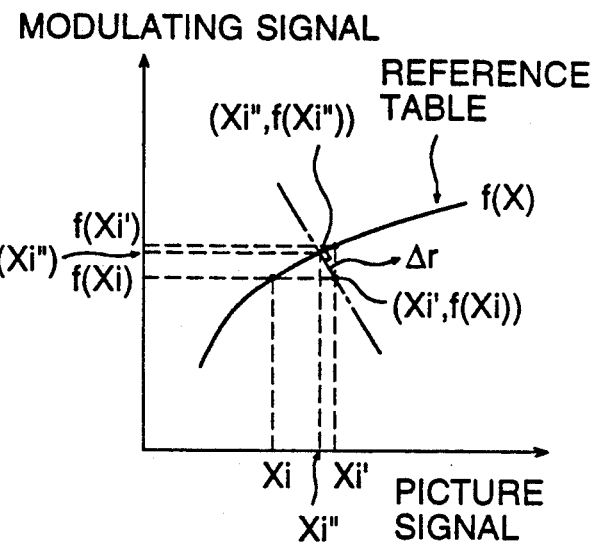
Figure 16:
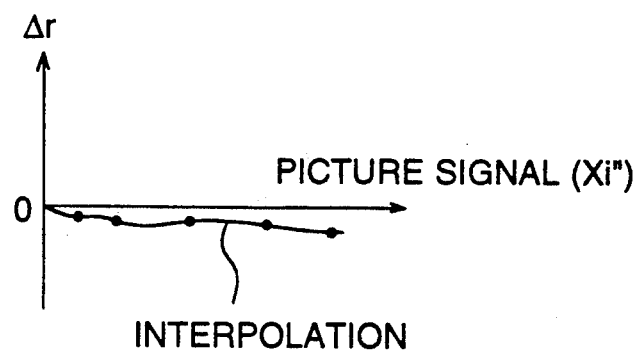
Figure 17:
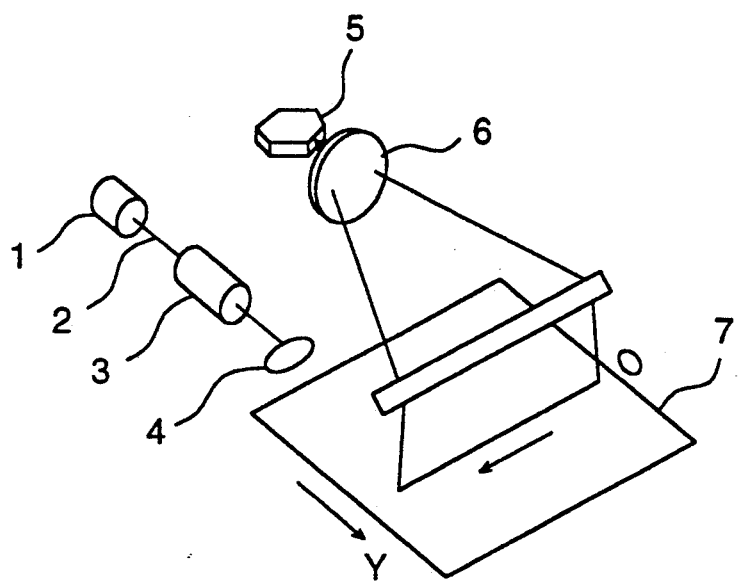
FIGS. 17 and 18 are schematic drawings representing a system of the conventional picture recorders.
Figure 19:
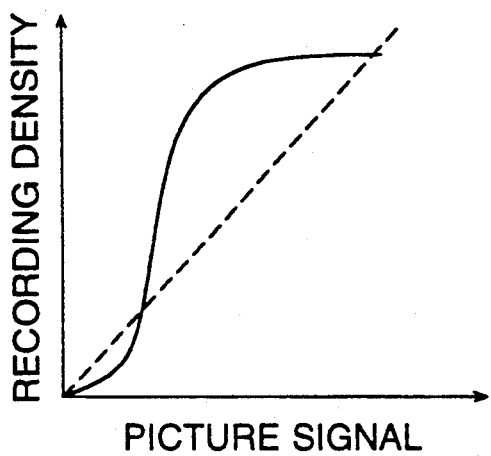
FIG. 19 is a diagram representing an example of the recorded gray level characteristics to the picture signal.
Figure 20:
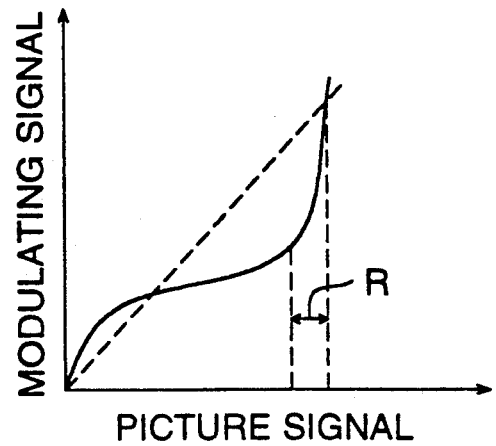
FIG. 20 is a diagram representing an example of the picture signal conversion table to get the desired gradation characteristics.
Figure 18:
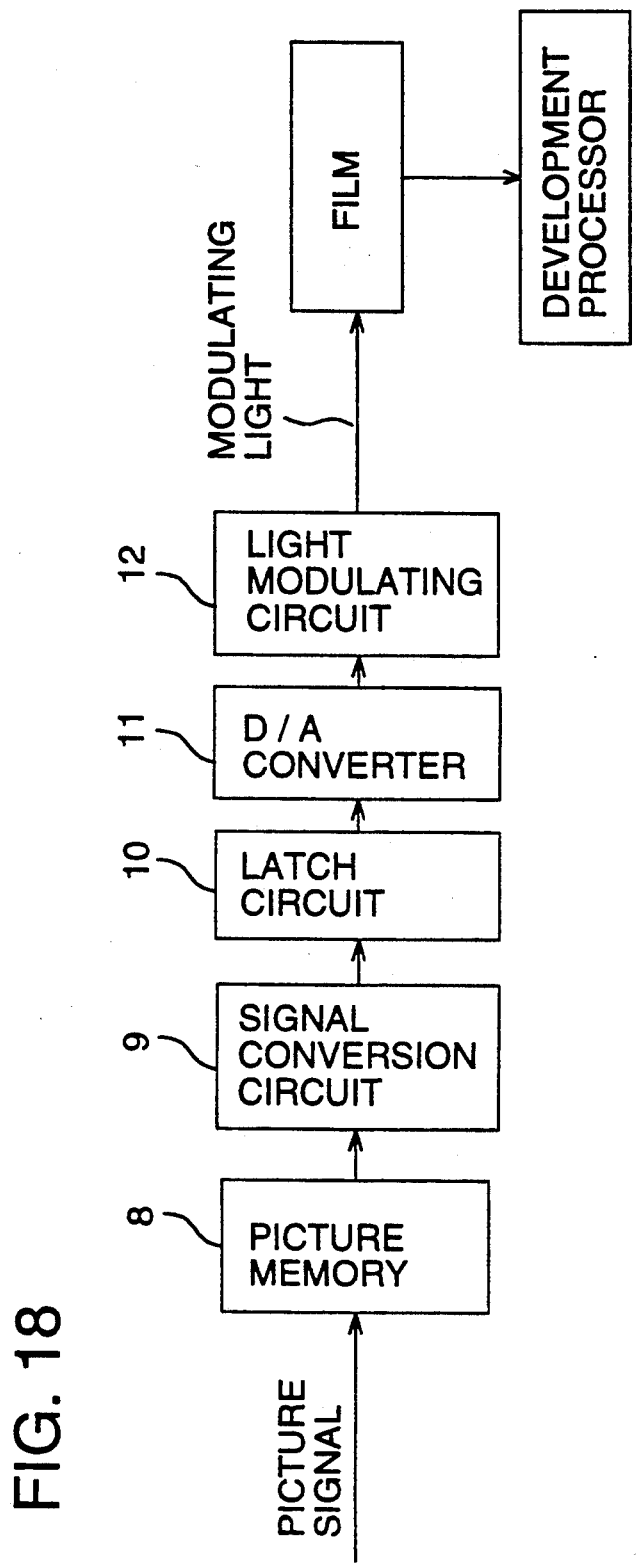

The third embodiment is also realized by the picture recorder illustrated in FIG. 2. The description is given to the compensating and setting procedure with reference to diagrams in FIG. 13 and FIGS. 14 through 16. Steps 21 through 25 in FIG. 13 are the same as the S1 through S5 in FIG 3. As shown in FIGS. 14 and 15, correspondence between the gray level di' and picture signal Xi' to satisfy desired characteristic g(X) can be achieved if the light modulation signal obtained by converting the picture signal Xi' according to the conversion table becomes f(Xi).

As is clear from FIG. 15 which represents the conversion table on the quadratic coordinate, assuming the input picture signal on the abscissa and the light modulation signal (converted picture signal) on the ordinate; when compensating and setting the conversion table satisfying the desired characteristics by shifting the specified point on the characteristic curve f(X) showing the reference conversion table in the normal direction, the compensated coordinate points (Xi″, F(Xi″)) on the reference conversion table located at the minimum distance from coordinate points (Xi′ f(Xi), (compensating coordinate point) to have been confirmed to agree with the desired characteristics should be shifted in the normal direction by Δri.

As mentioned above, the S7 finds, for each of the reference input image signals Xi, compensating coordinates (Xi′, f(Xi)) determined by the gray level di′ obtained when the picture is recorded according to the light modulation signal F(Xi) which is obtained by converting the reference input picture signal Xi according to the reference conversion table, and the picture image Xi′ to correspond to this gray level, on the one hand; on the other, it finds the compensated coordinate points (Xi″, f(Xi″)) on the reference conversion table to be shifted to said compensating coordinate points (Xi′ f(Xi)), as the coordinate points on the reference conversion table located at the minimum distance from the said compensating coordinate points ((Xi′ f(Xi)); at the same time, it obtains the displacement distance Δri for each of the said compensated coordinate points (Xi″, f(Xi″)).

In the present embodiment, if the compensating coordinate points (Xi′,f(Xi)) are located above the characteristic curve f(X) of the reference conversion table, positive sign (+) is attached to the Δri, whereas negative sign (−) is assigned if they are located below; thereby giving distinction between the two.

The above processing obtains at least the number of the compensating coordinate points agreeing with that of the reference input picture signals Xi, and the characteristic curve resulting from connection of these compensating coordinate points provides the characteristic curve agreeing with the desired characteristics. In the present embodiments, however, the new conversion table is got by modifying the reference conversion :able as described below, without the conversion table being set by direct interpolation of the said compensating coordinate points.

In the S28, the discrete data of displacement distances Δri obtained for each of compensated coordinate points (Xi″, f(Xi″)) set on the reference conversion table as described above is subjected to calculation of interpolation with respect to input picture signal Xi″, in such a manner that data on the displacement distance with respect to each input picture signal X; can be obtained as imaginary continuous data.

Said Δri is a data which compensates the reference conversion table into the characteristic corresponding to the desired gradation characteristic g (X). Especially when the reference conversion table satisfies the desired gradation characteristic g(X), its absolute value is sufficiently small (see FIG. 16), so the precision of interpolation does not reduce substantially even if the interpolation is performed according to comparatively small amount of data Δri; the value to shift from point to point on the reference conversion table can be estimated with high precision between the sampling data. Even when the required characteristic is much changed on the reference conversion table and the absolute value of the said Δri is increased, the change rate of the said Δri with respect to the picture signal level does not increase very much; therefore, it is quite possible to cope with the great change of the required characteristics with a sufficient interpolation precision.

Each compensated coordinate point on the reference conversion table is shifted in the axial direction of the input picture signal for compensation, based on the continuous data on displacement distance Δr with respect to the said input picture signal X, thereby setting the conversion table which can satisfy the desired characteristic of the recorded gray level with respect to input picture signal X.

To put it concretely, the compensated conversion table F(X) can be obtained by plotting the points (X,F(X)) which are separated the distance Δr (Xi″) on the line (in the normal direction) orthogonal to the characteristic curve of the reference conversion table.

The above description of third embodiment of the present invention can be summarized as follows:

For example, assume that signal B is obtained through conversion of the reference input picture signal A according to the reference conversion table, and the picture gray level C got from said signal B fails to satisfy the desired characteristic, but the input picture signal to obtain the picture gray level C is D. In this case, if the reference conversion table is compensated and set in such a manner that the input picture signal D is converted into signal B according to the conversion table, it is possible to compensate and set the conversion table which satisfies the desired characteristics.

It has been confirmed that, when the point on the characteristic curve of the reference conversion table is to be shifted by the specific amount in the normal direction on the quadratic coordinates comprising the input picture signal axis on the conversion table and the converted picture signal axis, the coordinate points after compensation (compensating coordinate points) should be the coordinate points comprising the said input picture signal D and converted picture signal B. Conversely, if it is possible to know the coordinate points (compensated coordinate points) on the reference conversion table located at the minimum distance from the compensated coordinate points (D and B) satisfying the desired characteristics as mentioned above, and the minimum distance, then it is possible to determine points on the conversion table to shifted in the normal direction as well as the distance of this shift, in order to achieve compensation necessary to satisfy the desired characteristics.

Thus, the compensating coordinate points (points where the compensated conversion table passes) which agree to the demanded characteristic as said coordinate points (D, B) is found out by recording the picture according to each reference input picture signal; then points on the reference conversion table to be the compensated coordinate points for each compensating coordinate points (D and B), and the displacement distance (the minimum distance between the converted coordinate points (D,B) and the reference conversion table) for shifting the said compensated coordinate points to the compensating coordinate points (D,B) in the normal direction are found out.

Furthermore, if the discrete data of the displacment distance (minimum distance) with respect to the compensated coordinate points on the reference conversion table obtained in the above manner is interpolated and is made into the imaginary continuous data, it is possible to obtain the conversion table conforming to the desired characteristics by shifting the points on the reference conversion table in the normal direction by the specified distance.

Even if the reference conversion table is assumed to have linear characteristics, the said displacement distance data function obtained in the above manner has no portion where the change rate of the function become very large; therefore, even if the number of data of the minimum distance or the number of the reference input picture signals is small, a higher-precision interpolation can be calculated using the known interpolation calculating method, than the case where the interpolation of plotting the said compensating coordinate points (D,B) is performed. This makes it possible to compensate and set the reference conversion table with high precision.

In the embodiments 1, 2 and 3, the distance to move the reference conversion table (see FIGS. 5, 10 and 15) in the direction of the picture signal is found out; consequently, the reference conversion table may be set to either the linear or non-linear characteristics. When setting it to the non-linear characteristics, use of the reference conversion table conforming approximately to the desired gradation characteristics in particular is preferred.

In the calculation of the interpolation for ΔXi, ΔYi and Δri, it is possible to use a known interpolation calculating method such as a spline interpolation method (see "Spline Function and its Application" by Ichida and Yoshimoto, 1979, Tokyo), which discloses a linear interpolation, combining a linear interpolation with a smoothing method, to provide an approximation of the function of n-the degree.

The number of the data on the reference picture signals Xi and corresponding gray level di is set to about 2 to 50, but should preferably be 4 to 30. When the gray level data detecting means is so configured as to include the gray level measurement by manual operation in the present invention, the number of the data on Xi and di should be comparatively small 2 to 10, and it is especially preferred to use the high-degree interpolation calculation such as spline interpolation and approximation of function of n-the degree (n=|3|) as the said interpolation calculation method. This does not apply, however, to the cases where the said gray level data detecting means comprises the automatic gray level measuring instrument.

Furthermore, in the present embodiments, the desired gradation characteristics of the recorded gray level for the picture signal have been assumed as linear characteristics, as shown in FIGS. 4, 9 and 14. However, the desired characteristics are not always linear, depending on the individual cases; thus, the said gradation characteristics are not limited to linear ones.

In the present embodiments, the equipment is configured such that changes of the light source for exposure, film exposure characteristics and development characteristics and the like are all compensated integrally by the independent conversion table related to the present invention. By way of an example, the conversion table designed to compensate the change of the output characteristics of the light source for exposure and the conversion table compensating and setting means specifically designed for said conversion table are provided independently; and the conversion table which compensates the output characteristics of the light source for exposure according to the data obtained by photoelectric transfer of the scanning light is compensated and set as appropriate. When the picture is to be recorded, the conversion table for said light source characteristics compensating conversion table and the conversion table which is set on the basis of the recorded picture gray level according to the present invention are used in combination.

New setting of the conversion table by compensating the reference conversion table as described above, for example, may be performed automatically whenever the power of the picture recorder is turned on, or may be performed at any desired time by a trigger switch.

As described above, when the picture signal conversion table to be set to satisfy the desired characteristics of the recorded gray level for the picture signal is to be compensated according to the changing conditions, the present invention provides high-precision updating and setting of the picture signal conversion table, even if the number of the sample data for checking the status of temperature changes is small, or even if the characteristics undergo substantial changes. Furthermore, the present invention provides the advantage of ensuring simple and high-precision updating of the conversion table, which stabilizes and makes uniform the relation between the picture signal and recorded gray level.

What is claimed is:

1. An image recording apparatus for receiving an input image signal indicating a recording density level of a pixel, and for converting the image signal into a modulating signal to modulate a light beam and for producing a recording density level on a recording medium with the light beam, wherein the image recording apparatus has a recording characteristic that is representative of a relation between the image signal and the recording density level, comprising:

conversion means having a preset conversion table for converting the image signal into a corresponding modulating signal, such that the corresponding modulating signal is output in response to the input image signal, and wherein the preset conversion table is adapted to convert a given number of image signals;

testing means including correlating means for correlating plural reference image signals and plural reference density levels with each other based on a desired recording characteristic, the testing means including inputting means for inputting the plural reference image signals into the conversion means, thereby obtaining plural actual density levels from the image recording apparatus, and wherein the number of reference image signals is smaller than the given number of image signals that are used to provide the preset conversion table;

correcting means for calculating a density deviation between a reference density level and the actual density level for each of the reference image signals, said correcting means further calculating a correction value in relation to the preset conversion table so as to eliminate a density deviation therebetween, said correcting means obtaining correction values for each of the reference image signals;

interpolating means for interpolating between the correction values so as to provide each of the given number of image signals with a corresponding correction value; and table correction means for correcting the preset conversion table with the correction values for the given number of image signals so that the image recording apparatus is provided with a corrected conversion table, so that said recording apparatus has said desired recording characteristic.

2. The image recording apparatus of claim 1, wherein said correction value is a value that is used to correct an input image signal.

3. The image recording apparatus of claim 1, wherein the correction value is a value that is used to correct an output modulating signal.

4. The image recording apparatus of claim 1, wherein each correction value is a value that is used to correct both an input image signal and an output modulating signal.

5. The apparatus of claim 1, wherein the correcting means provides:

a two dimensional coordinate system that comprises an image signal axis and a modulating signal axis; and a desired correction point on said two dimensional coordinate system that is determined by a desired image signal; and if a reference modulating signal corresponds to a reference image signal; then the correction means provides a desired point on that one of a plurality of possible curves that not only corresponds to the desired recording characteristic but also is located on the two-dimensional coordinate system such that the desired curves so that a distance between the desired point and the correction point is a minimum; and said correction means further provides a given desired point and a given minimum distance for each of the plurality of actual density levels; and wherein said correcting means uses the given minimum distances between each desired point and a corresponding correction point as the plurality of correction values.

* * * * *